United States Patent [19]

Weitzler

[11] 4,302,752
[45] Nov. 24, 1981

[54] ELECTRONIC REMINDER

[76] Inventor: David A. Weitzler, 25 Fraser Rd., Framingham, Mass. 01701

[21] Appl. No.: 64,828

[22] Filed: Aug. 8, 1979

Related U.S. Application Data

[63] Continuation of Ser. No. 906,248, May 15, 1978, abandoned.

[51] Int. Cl.³ .............................................. G08B 1/00
[52] U.S. Cl. ............................. 340/309.1; 340/309.4
[58] Field of Search .................... 340/309.1, 309.4; 360/12; 364/900; 58/152 R; 307/141.8

[56] References Cited

U.S. PATENT DOCUMENTS

| | | | |
|---|---|---|---|
| 3,794,778 | 2/1974 | Smith | 360/12 |
| 3,903,515 | 9/1975 | Haydon | 340/309.1 |
| 3,987,430 | 10/1976 | Saarem | 340/309.1 |
| 4,070,698 | 1/1978 | Curtis | 360/12 |
| 4,081,754 | 3/1978 | Jackson | 340/309.4 |

Primary Examiner—Harold I. Pitts
Attorney, Agent, or Firm—John E. Toupal

[57] ABSTRACT

A time-keeping device for issuing reminders at predetermined times and including a computer with a memory for receiving and storing information and a processor for processing the stored information. A clock provides timing signals to the processor and an audio system records and reproduces messages on distinguishable tracks of a recorder. Information identifying a plurality of specific future times each associated with one of the tracks is introduced into the computer memory by a programmer and a selector selects and prepares any of the tracks for operative coupling to the audio system. In response to the occurrence of a specific time preset into its memory, the computer energizes a signalling device to alert an individual that activation of the audio system will produce a message reminder previously recorded on a track associated with the occurred time and automatically selected by signals from the processor.

17 Claims, 5 Drawing Figures

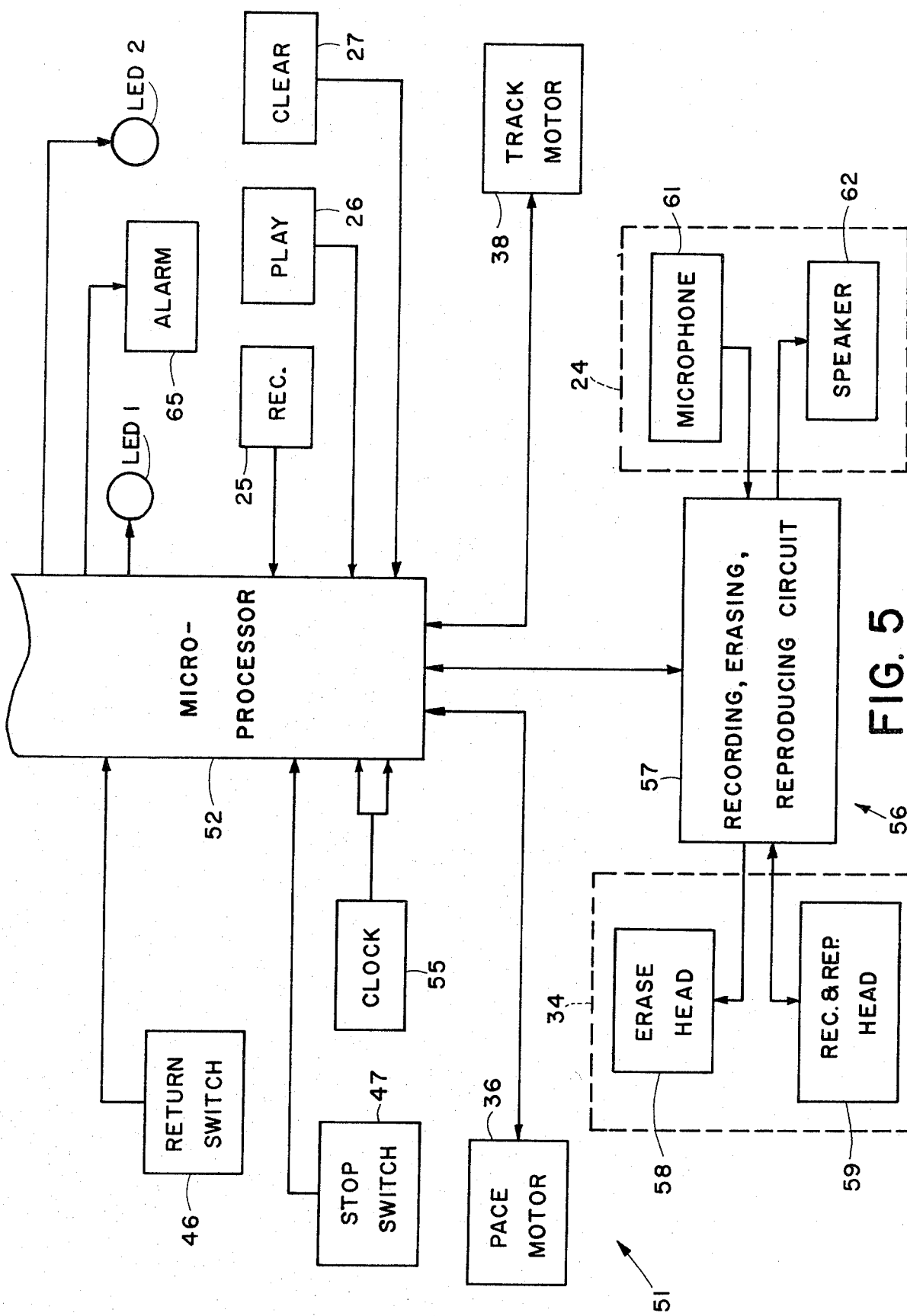

4,302,752

ELECTRONIC REMINDER

This is a continuation of my copending U.S. patent application Ser. No. 906,248, filed May 15, 1978, now abandoned.

BACKGROUND OF THE INVENTION

This invention relates generally to a device for signalling the occurrence of a specific time and, more particularly, to such a device for also providing an audio reminder associated with the specific time.

A strict reliance on one's memory often results in a failure to execute a previously schedule activity. For example, memory failures can cause one to miss business and social appointments; fail to acknowledge commerative days such as birthdays, anniversaries and holidays; neglect to administer medicines at prescribed times; etc. In attempts to obviate these problems, many people employ appointment books, calendar notations and other similar types of reminders. However, these techniques prove ineffective for those cases in which a user fails to consult the reminder in a timely manner.

The object of this invention, therefore, is to provide a device that will alert one to the occurrence of a specific time at which a specific action is to be taken.

SUMMARY OF THE INVENTION

The invention is a time-keeping device for issuing reminders at predetermined times and including a computer with a memory for receiving and storing information and a processor for processing the stored information. A clock provides timing signals to the processor and an audio system records and reproduces messages on distinguishable tracks of a recorder. Information identifying a plurality of specific future times each associated with one of the tracks is introduced into the computer memory by a programmer and a selector selects and prepares any of the tracks for operative coupling to the audio system. In response to the occurrence of a specific time preset into its memory, the computer energizes a signalling device to alert an individual that activation of the audio system will produce a message reminder previously recorded on a track associated with the occurred time and automatically selected by signals from the processor.

In a preferred embodiment of the invention, the reminder programmer includes a calendar programmer for introducing into the computer memory the dates of the specific future times, a time programmer for introducing into the memory the specific time of day of the future times and a periodicity programmer for introducing into the computer memory information identifying a predetermined periodicity for each of the specific future times. The calendar and time programmers facilitate the entry by both date and time of future commitments to be remembered and the periodicity programmer provides for the repeated signalling of repetitive reminders without a requirement for resetting of the device after each reminder has been given.

One feature of the invention is a recording mechanism including a recording tape having transversely spaced apart parallel recording tracks and a magnetic recording and reproducing head selectively movable along the tracks. The magnetic head is controlled by an X-Y transport mechanism including a track motor and worm screw assembly for aligning the head with a specific track in response to signals from the processor and a pace motor and worm screw assembly for moving the head over the selected track.

DESCRIPTION OF THE DRAWINGS

These and other objects and features of the invention will become more apparent upon a perusal of the following description taken in conjunction with the accompanying drawings wherein:

FIGS. 4 and 5 are schematic circuit diagrams of electrical circuitry employed in the device shown in FIG. 1.

DESCRIPTION OF THE PREFERRED EMBODIMENT

Figure 1:
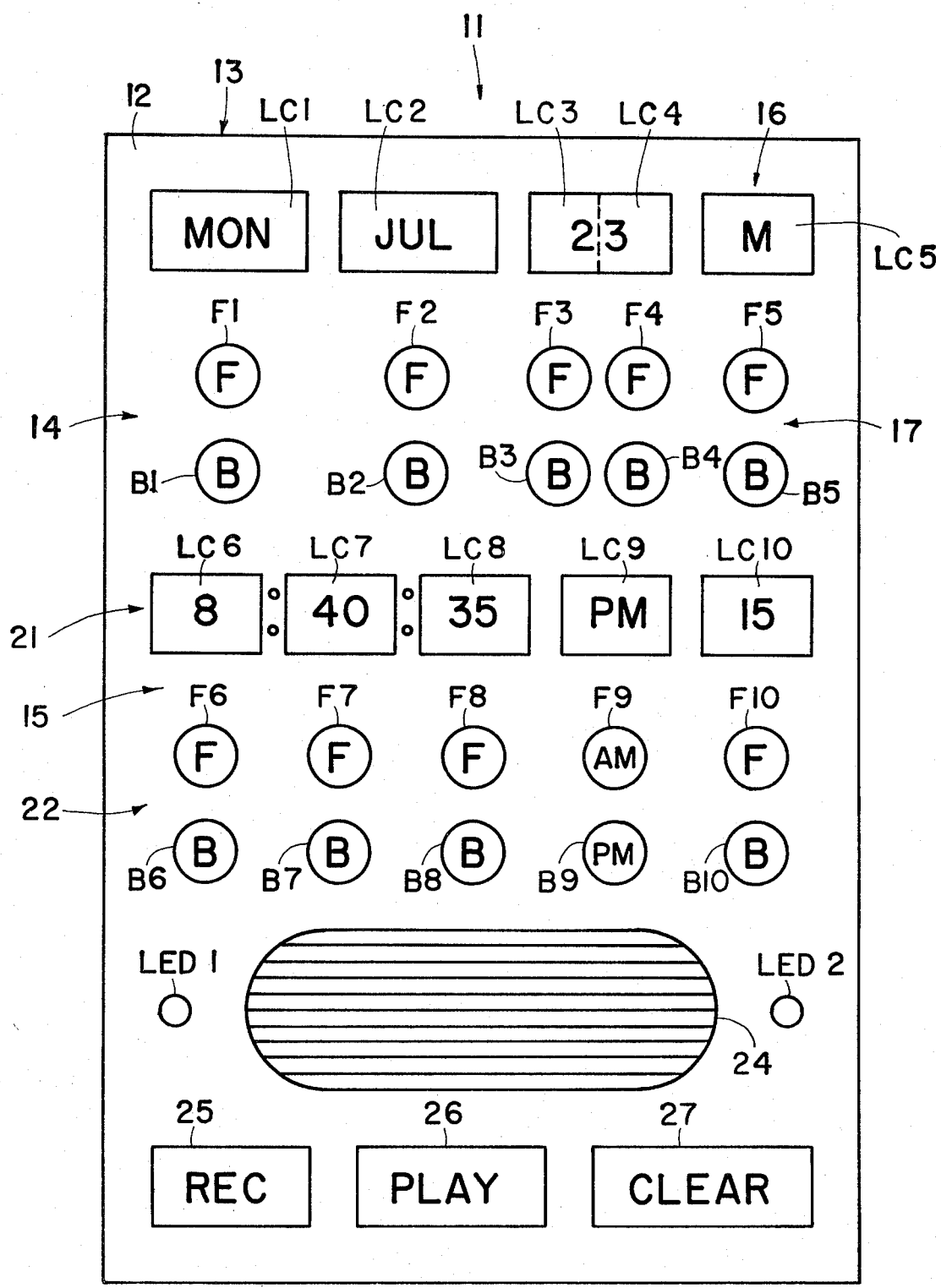
FIG. 1 is a pictorial plan view illustrating a signalling reminder device according to the invention.

Referring now to FIG. 1 there is shown a miniaturized, reminder device 11 according to the invention. Mounted in a face 12 of a housing 13 is a calendar time programmer 14 and a time-of-day programmer 15 both operatively connected to a micro-computer retained by the housing 13 as described hereinafter. Included in the calendar time programmer 14 are an array 17 of calendar time-setting button switches and a calendar display 16 comprising a plurality of liquid crystals LC1–LC5 that are controlled by the switch buttons of the array 17. The liquid crystal LC1 displays a day of the week, the liquid crystal LC2 displays a month of the year, the liquid crystals LC3 and LC4 display a day of a month and the liquid crystal LC5 displays a predetermined date periodicity as described hereinafter. Activation of either a button F1 or a button B1, respectively, causes the display on the liquid crystal LC1 to progress either forwardly or backwardly through the weekdays, MON, TUE, . . . SUN, ANY, the function for the latter of which will be described hereinafter. Similarly, in response to activation of button switches F2 or B2 the display on the liquid crystal LC2 can be made to progress either forwardly or backwardly through the months JAN, FEB, . . . DEC, ANY. Again, the function of the latter designation, ANY, will be described hereinafter. The tens digit of a month displayed by the liquid LC3 is made to progress either forwardly or backwardly through 0, 1, 2, 3, . . . by appropriate activation of either of the switch buttons F3 or B3 while the unit digit of a day displayed by the liquid crystal LC4 progresses forwardly or backwardly through 0, 1, 2, . . . 9 in response to activation of either of the switch buttons F4 or B4. Finally, activation of either of the switch buttons F5 or B5 causes the display on the liquid crystal LC5 to progress forwardly or backwardly through O, D, W, M, and Y. As explained hereinbelow, the display occurring on the liquid crystal LC5 establishes the periodicity of a reminder to be given at particular times established by the programmers 14 and 15.

The time-of-day programmer 15 includes a time-of-day display 21 and an array 22 of button switches for control thereof. Included in the time-of-day display 21 is a liquid crystal LC6 that can be made to progress either forwardly or backwardly through the hours 1, 2, . . . 12, in response to alternate activation of either a button switch F6 or a button switch B6. Activation of either a button switch F7 or a button switch B7 causes the minute display on a liquid crystal LC7 to progress either forwardly or backwardly in five-minute intervals through 00, 05, ... 55. A liquid crystal LC8 displays the seconds of actual current time under the control of a clock mechanism retained by the housing 13 but is not controlled by button switches in the array 22. Activation of buttons F9 or B9 controls a meridian display in a liquid crystal LC9 which is caused to shift between AM and PM. A final display on the face 12 of the device 11 is provided by a liquid crystal LC10. In response to alternate activation of either a button F10 or a button B10, respectively, the display provided by the liquid crystal LC10 moves forwardly or backwardly through a series of designations 1, 2, 3, ... X, each representing a reminder recorded on a distinct track in the device 11, with X representing the total number of message reminders that can be simultaneously retained. The function of the track display on the liquid crystal LC10 will be described in greater detail below.

Also mounted in the face 12 of the housing 13 is a speaker-microphone reproducer assembly 24 electrically coupled to a recording mechanism described below in connection with FIGS. 2 and 3. Operation of the recorder is controlled by a record button 25 and a play button 26 mounted in the face 12 of the housing 13. Also mounted in the face 12 is a clear button 27, the function of which is described below. Finally, a light emitting diode LED1 is energized, as described below, to signal the occurrence of a specific time previously fed into the device 11 with the programmers 14 and 15. Another light emitting diode LED2 is energized to signal that the full reminder message capacity of the device 11 has been reached and that no further additional message reminders can be accepted.

Figure 3:
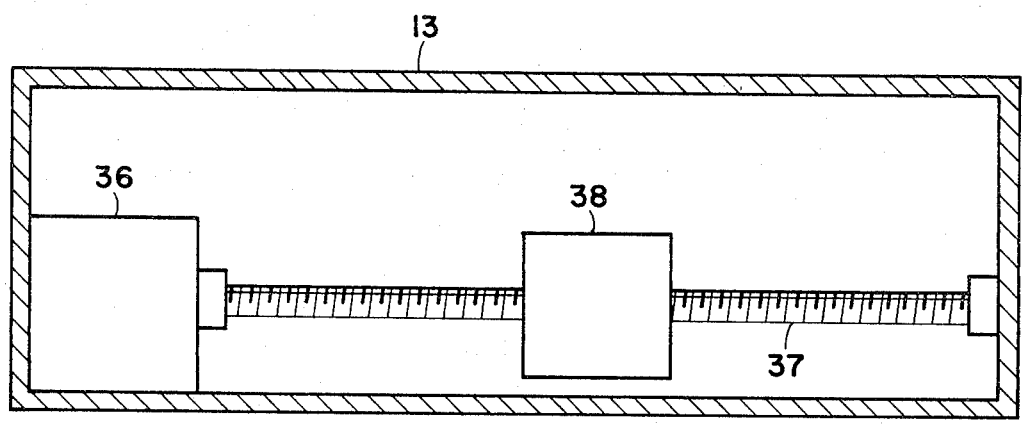
FIG. 3 is a side view of the recording mechanism illustrated in FIG. 2.
Figure 2:
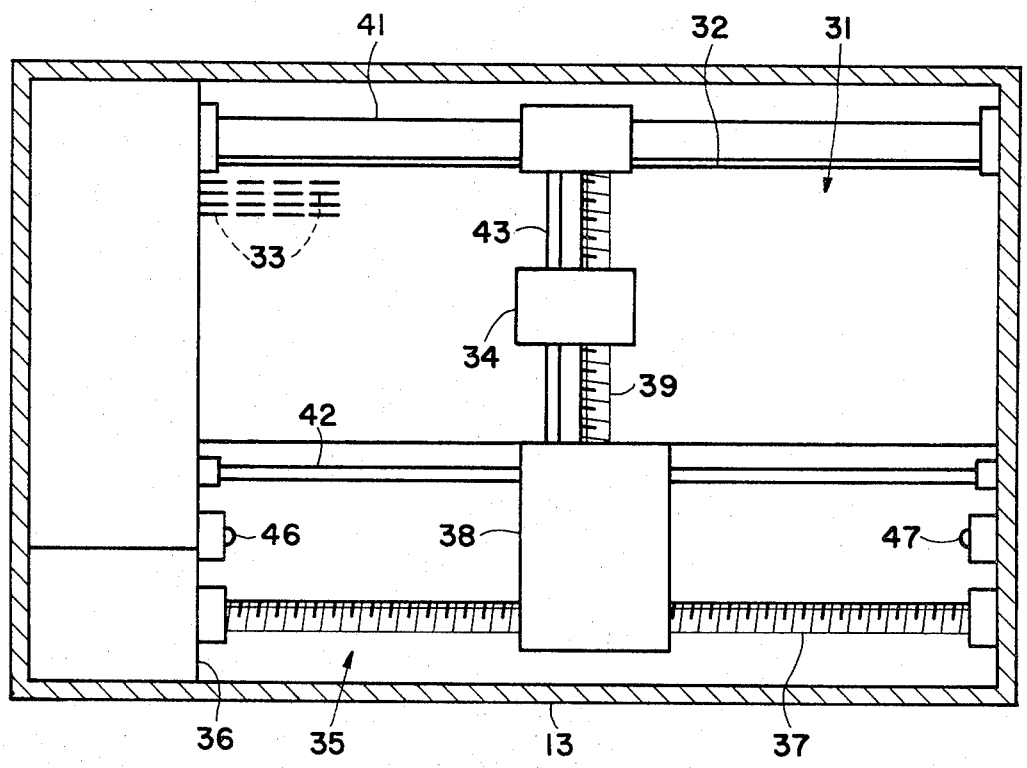
FIG. 2 is a schematic top view of a recording system included in the device shown in FIG. 1.

Referring now to FIGS. 2 and 3, there is shown a reminder message storage mechanism 31 retained within the housing 13. The recording mechanism comprises a strip 32 of magnetic film that forms a plurality of transversely spaced apart, parallel recording tracks 33. Each of the tracks 33 can record and reproduce a distinguishable, audio message reminder in response to movement thereover of a recording and reproducing magnetic head 34. Selective control of the specific track 33 traversed by the magnetic head 34 is provided by an X-Y transport mechanism 35 also retained within the housing 13. Included in the transport mechanism 35 is a pace motor 36 in driving engagement with a pace worm screw 37 that extends parallel to the tracks 33 on a magnetic film 32. A stepping track motor 38 is mounted for movement along the pace worm screw 37 in response to rotation thereof. Operatively engaged with the track motor 38 is a track worm screw 39 having an opposite end supported by a guide 41 extending between opposite ends of the housing 13. The track worm screw 39 supports and is operatively engaged with the magnetic head 34 so as to produce selective movement thereof along the magnetic film 32. Stability and guidance for the track motor 38 is provided by a rod 42 that is supported by the housing 13 and extends adjacent one edge of the magnetic film 32. A similar rod 43 extending between the track motor 38 and the guide 41 provides a rotational stability for the magnetic head 34.

During operation of the recording mechanism 31, the stepping track motor 38 is selectively energized to position the magnetic head 34 in alignment with any of the recording tracks 33. Once such alignment is established, energization of the pace motor 36 produces axial movement of the track motor 38 along the worm screw 37 between opposite ends of the housing 33. This movement in turn causes the magnetic head 34 to traverse the particular recording track 33 with which it has been aligned. Located at opposite ends of the housing 13 are contact switches 46 and 47 that provide signals indicating that the track motor 38 has completed a traversal of the magnetic film 32.

Figure 4:
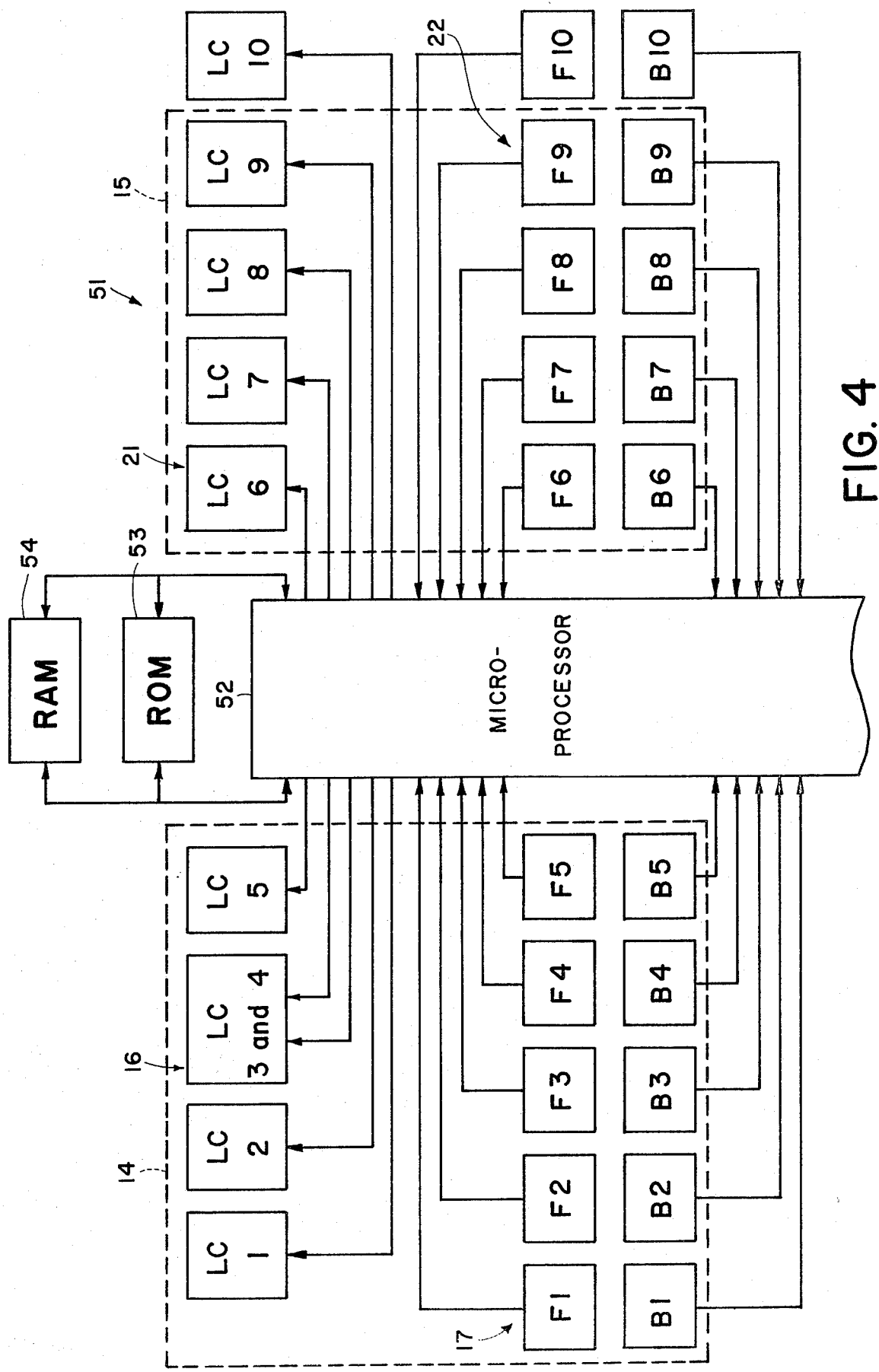

Reference is made now to FIGS. 4 and 5 which when combined form a schematic block diagram of an electronic control circuit 51 used in the message reminder device 11. To provide continuity, components of FIGS. 4 and 5 that are common to FIGS. 1–3 are identified by the same reference numerals. The basic component of the circuit 51 is a micro-computer including a microprocessor 52 and associated read only memory (ROM) 53 and a random access memory (RAM) 54. Information identifying the dates of specific future times is keyed into the switch button array 17 which transfers the information to the micro-processor 52 for storage in the RAM 54. Simultaneously with the entry of such information, the micro-processor 52 provides signals to the date display 16 that results in a visible display of the information being entered. Similarly, information identifying specific times of future dates is entered into the button array 22 and transferred to the micro-processor 52 for storage in the RAM 54. That information is simultaneously displayed on the time-of-day display 21 so as to provide a visible verification of the information being entered. The ROM 53 is preprogrammed to provide the micro-processor 52 with instructions for processing date and time information entered into a RAM 54. Timing pulses for tracking both current and future times are applied to the micro-processor 52 by an electronic clock 55.

The control circuit 51 also includes an audio system 56 comprising a recording, erasing and reproducing circuit 57 that is operatively coupled to the microprocessor 52. The recording, erasing and reproducing circuit 57 is connected for signal exchange with an erase head 58 and a recording and reproduction head 59 of the head assembly 34 shown in FIGS. 2 and 3. Also connected for signal exchange with the recording and reproducing circuit 57 are a microphone 61 and a speaker 62 of the microphone and speaker assembly 24 shown in FIG. 1.

The micro-processor 52 is connected also for signal exchange with the pace motor 36 and the track motor 38 shown in FIGS. 2 and 3 and receives information signals from the reversing switches 46 and 47 shown therein. Additional input signals are applied to the micro-processor 52 from the record button switch 25, the play button switch 26 and the clear button switch 27 all shown in FIG. 1. Finally, the micro-processor 52 provides signals that control energization of the LED1 and LED2 shown in FIG. 1 and for activating a buzzer alarm 65 retained within the housing 13 of the device 11.

To introduce a desired message reminder into the device 11, a master switch is activated making power available for the date programmer 14, the time-of-day programmer 15, the track display LC10 and control buttons F9 and B9 therefor, and the audio circuit 56. Initially the micro-processor 52 supplies signals that result in display of the current date on the liquid crystals LC1, LC2, LC3 and LC4 and the current time on the liquid crystals LC6, LC7, LC8 and LC9. A specific future time can then be introduced into the RAM 54 by appropriate manipulation of the date switch button array 17 and the time-of-day switch button array 22. For example, assuming that an appointment on July 23 at 9:00 p.m. is to be remembered, either of the switch buttons F2 or B2 are activated to cause appearance of JUL in the liquid crystal LC2 and either of the buttons B3 or F3 and B4 or F4 are activated to produce appearance of 23 in the liquid crystals LC3 and LC4. Next, assuming that a 20-minute advanced warning is desired, either of the buttons F6 or B6 are activated to introduce the hour 8 into the liquid crystal LC6, either of the buttons F7 or B7 is activated to introduce the digits 40 into the liquid crystal LC7 and the button B9' is activated to cause display of PM in the liquid crystal LC9. Finally, assuming that the appointment is a one-time event, either of the periodicity buttons F5 or B5 are activated to produce display of 0 in the liquid crystal LC5. After programming the desired future time into the displays 16 and 12, the record button 25 is activated causing the displayed information to be introduced into the queue of reminders waiting recall in the RAM 54. In addition, the micro-processor 52 responds by searching the RAM 54 for an unassigned track and, upon location thereof, commits to memory that the located track number is now assigned, and signals the track motor 38 to position the head assembly 34 over that particular track. The micro-processor 52 also causes the reproducing, erasing and reproduction circuit 57 to enter the erase, record mode, energizes the pace motor 36 to produce a traversal of the track by the head assembly 34 and initiates a countdown on the liquid crystal LC8 indicating the seconds remaining for recording on the track being traversed. During this period a desired message can be spoken into the microphone 61 resulting in a recording thereof on the specific track being traversed by the head assembly 34. Upon completing a traversal of the film 32, the track motor 38 engages the return switch button 47 causing the micro-processor 52 to reverse energization of the pace motor 36 and to de-activate the record, erase and reproduction circuit 57 and to effect return of the recording head assembly 34 to the starting position on the recording track. Upon reaching the start, the track motor 38 actuates the start switch button 46 causing the micro-processor 52 to de-energize the pace motor 36 and discontinue movement of the head assembly 34. In the event that the search of the RAM 54 fails to locate an unassigned track, the micro-processor 52 energizes the light emitting diode LED2 to indicate that the total reminder message capacity of the device has been reached. After having entered the desired reminder message, the power switch is opened to remove power from the date and time-of-day programmers 14 and 15. However, power continues to remain available to the micro-processor 52 which constantly utilizes signals from the electronic clock 55 to update the current date and time which are thereby maintained accurate. These current dates and times are continuously compared with the queue of reminder dates and times retained in the RAM 54.

Subsequently, when the previously introduced specific time of 8:40 p.m. on July 23 actually occurs, the specific recording track assigned to that time is made the current track and put on display in the liquid crystal LC10. The micro-processor 52 then energizes the track motor 38 to produce movement of the head assembly 34 into alignment with the then current track and energizes the light emitting diode LED1 and the buzzer alarm 65 producing both visible and audible signals that the specific time for a message reminder has occurred. Actuation of the play button 26 causes the micro-processor 52 to switch the recording, erasing and reproducing circuit 57 into its reproducing mode and energizes the pace motor 36 to cause a traversal of the current recording track by the head assembly 34. Consequently, the previously recorded message on that track is audibly reproduced by the speaker 62. Upon completion of the track traversal by the head assembly 34, engagement of the return switch button 47 by the track motor 38 again causes return of the recording and reproduction head assembly 34 to the starting portion where engagement with the switch button 46 results in de-energization of the pace motor 36 and the recording and erasing and reproducing circuit 57. Also, since the periodicity programmer 16 has been set for 0, the processor 52 automatically makes that specific recording track again available in the RAM 54.

To further exemplify use of the periodicity programmer 16, assume that there exists a daily requirement for some specific action. For example, a prescribed medicine might require administration at a given time each day. In that event, the given time would be introduced into the RAM 54 by appropriate actuation of the time-of-day switch button array 22 while observing the time-of-day display 21. Also, switch buttons F1-F4 or B1-B4 would be activated to produce the appearance, respectively, of ANY, ANY, 0 and 0 in the liquid crystals LC1-LC4 indicating that the message is desired on any weekday and on any date of any month. Having established the appropriate time of day on the display 21, either of the switch buttons F5 or B5 is actuated to cause appearance on the liquid crystal LC5 of the letter D indicating a desired daily periodicity. Activation of the record button 25 then introduces the programmed specific time and periodicity information into the RAM 54 and prepares the device 11 to record a desired message as described above. Daily thereafter at the specified time, the light emitting diode 1 and the buzzer alarm 65 are energized to indicate that a recorded message reminder is due. An audio reproduction of that reminder message is obtained in the manner described above. However, in this case, rather than clearing the recorded track after reproduction of the reminder message, the micro-processor 52 responds to the programmed daily periodicity by retaining the recording track assignment and specified time of reminder in the memory of the RAM 54.

Assume now that there exists a given commitment at a given time on the same day of each week. One might have, for example, a tennis engagement at the same time on Monday of each week. The precise time of day would be entered by the time-of-day programmer 15 as described above and either of the buttons F1 or B1 activated to introduce MON representing Monday onto the liquid crystal LC1. Also, the buttons F2-F4 or B2-B4 are actuated to introduce ANY onto the liquid crystal LC2 and zeros on the liquid crystals LC3 and LC4 thereby indicating that the message is desired on any Monday. Next, either of the switch buttons F5 or B5 is activated to produce display in the liquid LC5 the letter W representing a weekly periodicity. Subsequent activation of the record button 25 results in introduction of the programmed information into the random access RAM 54 as described above. Subsequently, at the specified time on each Monday the light emitting diode LED1 and the alarm buzzer 65 are energized to signal the occurrence of a desired reminder message which after being received is retained for recall a week hence.

Assume next that a reminder is desired on a given date and time of each month. The specific date and time would be introduced, respectively, onto the date and time-of-day displays 16 and 21 and either of the buttons F1 or B1 actuated to produce an ANY in the liquid crystals LC1 indicating that the message is to be received on any weekday having the assigned date. Next, either of the periodicity buttons F5 or B5 are actuated to cause appearance in the liquid crystal LC5 of an M indicating the desired monthly periodicity. Thereafter, a signal will be given monthly by the device 11 upon the occurrence of the specified time and date.

Finally, to introduce a desired yearly reminder such as a birthdate or an anniversary date, the desired time of day is introduced onto the time-of-day display 21, the specified date is introduced onto the liquid crystals LC2, LC3 and LC4, ANY is introduced onto the liquid crystal LC1, and either of the buttons F5 or B5 are actuated to produce a Y on the liquid crystal LC5 indicating the desired yearly periodicity. The desired message reminder will then be repeated by the reminder device 11 yearly thereafter on the specified date and time. In the event that a message is having either a daily, weekly, monthly or yearly periodicity is no longer desired, the specific recording track number associated with that message is made to appear in the liquid crystal LC10 by either activation of either of the buttons F10 or B10 and the clear button 27 is actuated. This induces the micro-processor 52 to remove the information relating to that message from a memory of the RAM 54.

The simultaneous activation of switch buttons F8 and B8 causes the micro-processor 52 to introduce the time displayed on the time-of-day display 21 as current time. This procedure can be used, for example, to update the device after travel into different time zones.

Obviously, many modifications and variations of the present invention are possible in light of the above teachings. It is to be understood, therefore, that the invention can be practiced otherwise than as specifically described.

I claim:

1. A clock apparatus for producing reminders and comprising:
   a computer means comprising memory means for receiving and storing information and processor means for processing the stored information;
   a clock means providing timing signals to said processor means;
   a storage means for receiving a plurality of distinguishable messages, said storage means comprising a plurality of distinct storage elements, one for receiving each of said messages;
   reproducer means for reproducing the messages recorded on said elements;
   reminder programming means for selectively introducing into said memory means information identifying a plurality of specific future times, each associated with any selected one of said elements; said reminder programming means comprising calendar setting means for selectively introducing into said memory means the dates of said specific future times, periodicity means for introducing into said memory means information identifying a predetermined periodicity of each of said specific times and time setting means for selectively introducing into said memory means the time of day of said specific times;
   signal means energized by said processor means in response to the occurrence of any of said times introduced into said memory means; and
   selector means for selecting and preparing any of said elements for operative coupling to said reproducer means.

2. An apparatus according to claim 1 wherein said distinguishable messages comprise audio messages and said reproducer means comprises means for reproducing said messages audibly.

3. An apparatus according to claim 2 wherein said selector means responds to signals from said processor means by automatically selecting one of said elements associated with a specific future time upon the occurrence thereof.

4. An apparatus according to claim 3 including displaying means for displaying said specific times introduced into said memory means by said reminder programming means.

5. An apparatus according to claim 4 including display means for displaying said specific times introduced into said memory means by said reminder programming means.

6. An apparatus according to claim 5 wherein said selector means responds to signals from said processor means by automatically selecting one of said elements associated with a specific future time upon the occurrence thereof.

7. An apparatus according to claim 6 wherein said selector means is activated by said processor means to select and couple an unused one of said elements to said reproducer means in response to the activation of said reminder programming means to introduce a specific future time into said memory means.

8. An apparatus according to claim 7 including alarm means for providing an alarm signal in response to said activation of said reminder programming means when all of said elements retain stored messages.

9. An apparatus according to claim 8 wherein said storage means comprises recording tape means that define distinct tape track elements and magnetic head means movable along said track elements.

10. An apparatus according to claim 9 wherein said track elements comprise transversely spaced apart parallel paths on a single recording tape means.

11. An apparatus according to claim 10 wherein said selector means comprises transport means for moving said head means relative to said tape means.

12. An apparatus according to claim 11 wherein said transport means comprises track transport means for aligning said head means with a given one of said track elements in response to signals from said processor means, and pace transport means for moving said head means along said given track element.

13. An apparatus according to claim 12 wherein said track transport means comprises a track worm screw drive engaging said head means and a track motor for turning said track worm screw, and said pace transport means comprises a pace worm screw orthogonal to said track worm screw and engaging said track motor and a pace motor for turning said pace worm screw.

14. A clock apparatus for producing reminders and comprising:
   a computer means comprising memory means for receiving and storing information and processor means for processing the stored information;
   a clock means providing timing signals to said processor means;
   a storage means for receiving a plurality of distinguishable messages, said storage means comprising a plurality of distinct storage track elements, one for receiving each of said messages;

reproducer means for recording and reproducing the messages recorded on said tracks;

reminder programming means for selectively introducing into said memory means information identifying a plurality of specific future times, each associated with any selected one of said elements, said reminder programming means comprising periodicity means for introducing into said memory means information identifying a predetermined periodicity of each of said specific times;

signal means energized by said processor means in response to the occurrence of any of said times introduced into said memory means; and selector means for selecting and preparing any of said elements for operative coupling to said reproducer means.

15. An apparatus according to claim 14 wherein said selector means responds to signals from said processor means by automatically selecting one of said elements associated with a specific future time upon the occurrence thereof.

16. An apparatus according to claim 15 including display means for displaying said specific times introduced into said memory means by said reminder programming means.

17. An apparatus according to claim 1 wherein said periodicity means permits identification of daily, weekly, monthly or yearly periodicities.

* * * * *